A. A. LEY.
VEHICLE RIM.
APPLICATION FILED MAY 10, 1909.
959,236.
Patented May 24, 1910.
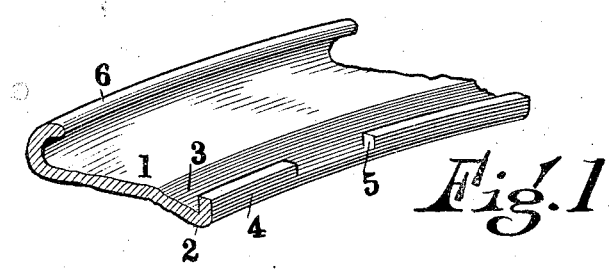
Fig.1
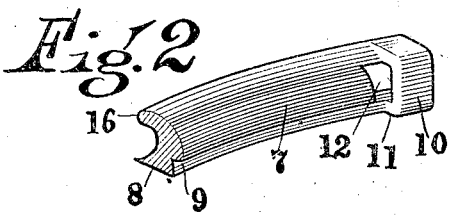
Fig.2
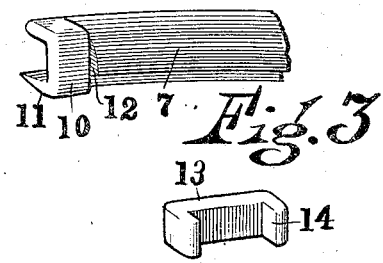
Fig.3
Fig.4
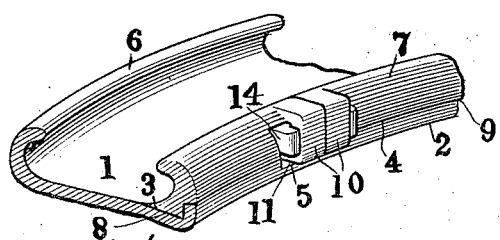
Fig.5
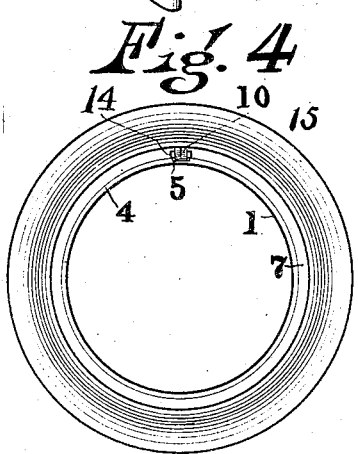
Fig.6
Witnesses:
Austin B. Hanscom
Glenara Fox
INVENTOR –
Adolph A. Ley,
BY C. E. Humphrey
ATTORNEY.

UNITED STATES PATENT OFFICE.

ADOLPH A. LEY, OF AKRON, OHIO.

VEHICLE-RIM.

959,236.  Specification of Letters Patent.  Patented May 24, 1910.

Application filed May 10, 1909. Serial No. 495,004.

*To all whom it may concern:*

Be it known that I, ADOLPH A. LEY, a citizen of the United States, residing at Akron, in the county of Summit and State of Ohio, have invented new and useful Improvements in Vehicle-Rims, of which the following is a specification.

This invention relates to vehicle wheel rims adapted to receive elastic tires, especially pneumatic tires having inextensible or semi-inextensible beads or edges and the object thereof is, broadly, to provide a wheel rim having retaining means for the tire, such that the tire may be readily seated thereon and removed therefrom.

In carrying into effect the foregoing object, the invention contemplates providing the wheel rim with a split annular holdfast device for a tire, said holdfast device being provided with new and improved means for locking the separated ends thereof when the device is mounted on a wheel rim, so that it will constitute effectual means for holding the tire securely in position on said rim.

A further and important object of this invention is to construct the locking means for the severed ends of the annular holdfast device so that the ends may be readily locked together and when so locked will effectually hold the annular holdfast device from unintentional displacement from its seat on the rim, said means being readily disconnected to permit the easy removal of the holdfast device.

A further object of this invention is to provide means for preventing circumferential movement of the tire-holding device with respect to the rim.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the claim hereunto appended.

In the drawings, in which similar reference numerals indicate like parts in the different figures: Figure 1 is a cross-sectional perspective view of a vehicle wheel rim and tire-seating portion of a wheel suitably-shaped for use in connection with my improved holdfast means. Figs. 2 and 3 are perspective views of the severed ends of the split annular holdfast device for the tire. Fig. 4 is a perspective view of a key adapted to be interlocked with the ends of the holdfast device shown in Figs. 2 and 3. Fig. 5 is a view similar to Fig. 1 with the holdfast device for the tire positioned thereon, with its ends locked together by the key shown in Fig. 4; and, Fig. 6 is a view in side elevation of a vehicle wheel rim embodying this invention with a tire mounted thereon.

Referring to the drawings in detail, the reference numeral 1 denotes a cylindrical rim having one side thereof formed with an endless offset 2, the upper face 3 of which is inclined and provided with a lateral outwardly-projecting flange 4 preferably provided with a notch 5, for a purpose to be stated. The inclined face 3 and flange 4 are arranged to constitute a seat for a purpose to be hereinafter set forth. The opposite side of the rim may be provided or formed with an upwardly-extending endless flange 6 constituting means for holding one side of the tire.

The means for holding the opposite side of the tire from that engaged by the flange 6 comprise a split annular ring 7 having an inclined base portion 8 adapted to be seated on the incline face 3 of the rim and is provided with a circumferentially-extending rabbet 9 fashioned to receive the flange 4 so that the upper face of the rabbet will rest on the outer surface of this flange with the lateral face of the ring 7 flush with the lateral face of the flange. The outer portion 16 of the ring 7 is inwardly-bent into a hook shape corresponding in contour to the permanent flange 6. The ring 7 is adapted to be sprung over the flange 4 and be mounted on the seat formed by the inclined face 3 and flange 4 and be held by the latter from outward movement and by the tire mounted on the rim from inward movement, the hook portion 16 thereof engaging the bead along the edge of the tire for holding the latter in position. Each of the severed ends of the split ring 7 is provided with a keeper 10, each comprising a laterally-projecting loop, the upper surface of which is preferably flush with the outer portion 16 of the ring 7 and the lower face 11 thereof is positioned inwardly of the upper face of the rabbet 9, for a purpose to be later described. The portion of each of the severed ends of the ring 7 inclosed by the keeper formed thereon is provided with a slotted recess 12 extending longitudinally thereof a short distance beyond the end of the keeper 10 for a purpose to be stated. These keepers are customarily formed integral with the ring 7 and are preferably similar to each other.

The locking member for detachably holding the severed ends of the ring 7 in operative engagement with one side edge of the base portion of the tire comprises a flat body portion 13 having projecting laterally from both ends thereof preferably at right angles to the body portion 13, short arms 14. The width of the key is such as to nicely fit in the slotted recesses 12 in the ends of the severed ring 7 and when positioned therein the projecting arms will interlock behind the keepers 12 and hold the severed ends of the ring fixedly against unintentional removal.

The preferred method of setting up a device embodying this invention consists in placing a tire, designated in the drawings by the reference numeral 15, on its seat on the rim, with one of the laterally-projecting beads thereof engaging under the permanent flange 6 sufficiently to cause the same to interlock therewith for holding that particular side of the tire in position, after which the split ring is expanded sufficiently to permit it to be sprung over the flange 4 and when relased to spring to place in its seat formed by the inclined portion 3 and flange 4 with the hook-shaped portion 16 thereof in engaging relation with the lateral bead on its respective side of the tire. Before the ends of the ring 7 are brought together, the key is positioned with one end thereof inserted in the slotted recess in one of the severed ends of said ring, after which the opposite end thereof is moved sufficiently, either by hand or a suitable tool, to cause the keeper 10 thereon to pass over the disengaged arm of the key and cause the arm to interlock behind the keeper, thereby effectually holding the ends of the severed ring in position, as clearly shown in Fig. 5. In positioning the ends of the ring 7 they will ordinarily be so placed as to cause the lower ends 11 of the keepers to extend into the notch 5 of the flange 4, thereby preventing circumferential movement of the ring 7 with respect to the rim.

In constructing a rim such as has just been described, the notch 5 in the flange 4 will preferably be placed opposite the aperture in the rim through which the inflating tube is inserted and while the key when in operative relation with the keepers 10 is in abutting relation with the lateral face of the bead of the tire which serves to hold the parts in position. As is well known in rims of this class the tire which is carried by the rim has its sides forced outwardly, thereby fixedly holding the key in interlocking engagement with the keepers, irrespective of the inflation of the tire. In dismounting the tire the same is first deflated and the keeper pushed inwardly sufficiently to disengage the arm thereof from interlocking engagement with the keepers, after which the ring may be easily removed from its seat.

What I claim and desire to secure by Letters Patent, is:—

In a vehicle wheel, a tire retaining means consisting of a split ring having each of its ends provided with a slot and a laterally-extending loop constituting a U-shaped keeper of less width than the length of the slot, each of said keepers extending over a portion of a respective slot, and a separate key provided with a pair of laterally-extending arms adapted to engage the inner sides of the keepers for coupling the split ends of the ring together, each of said slots positioned approximately centrally of the end of the ring in which it is formed and each of said keepers extending at right angles with respect to that slot over which it is arranged.

In testimony whereof I have hereunto set my hand in presence of two subscribing witnesses.

ADOLPH A. LEY.

Witnesses:
C. E. HUMPHREY,
GLENARA FOX.